United States Patent
Lin

(10) Patent No.: US 12,086,103 B2
(45) Date of Patent: Sep. 10, 2024

(54) INTELLIGENT STORAGE SYSTEM AND AN INTELLIGENT STORAGE METHOD THEREOF

(71) Applicant: Hsiu-Jen Lin, Changhua County (TW)

(72) Inventor: Hsiu-Jen Lin, Changhua County (TW)

(*) Notice: Subject to any disclaimer, the term of this patent is extended or adjusted under 35 U.S.C. 154(b) by 734 days.

(21) Appl. No.: 17/248,756

(22) Filed: Feb. 5, 2021

(65) Prior Publication Data
US 2021/0263890 A1    Aug. 26, 2021

(30) Foreign Application Priority Data
Feb. 20, 2020 (TW) .................. 109105426

(51) Int. Cl.
G06F 16/16    (2019.01)
G06F 3/14     (2006.01)
G07C 9/00     (2020.01)
G06F 3/0481   (2022.01)

(52) U.S. Cl.
CPC .............. G06F 16/16 (2019.01); G06F 3/14 (2013.01); G07C 9/00182 (2013.01); G06F 3/0481 (2013.01)

(58) Field of Classification Search
CPC ............................. G06F 3/14; G07C 9/00182
USPC ........................................................ 312/209
See application file for complete search history.

(56) References Cited

U.S. PATENT DOCUMENTS

| | | | | |
|---|---|---|---|---|
| 6,827,275 B2* | 12/2004 | Allen | ...................... | B25H 3/00 |
| | | | | 235/487 |
| 6,840,451 B2* | 1/2005 | Allen | ..................... | G06Q 10/06 |
| | | | | 235/462.09 |
| 7,250,865 B2* | 7/2007 | Maloney | ............. | G08B 13/1463 |
| | | | | 340/568.1 |
| 8,020,768 B2* | 9/2011 | Ramos-Elizondo | ........................ | |
| | | | | G06Q 10/087 |
| | | | | 235/487 |
| 8,068,929 B2* | 11/2011 | Teran-Matus | ........... | G06F 30/00 |
| | | | | 700/118 |
| 8,159,345 B2* | 4/2012 | Stevens | ................. | G06Q 10/087 |
| | | | | 340/568.1 |
| 9,741,014 B2* | 8/2017 | Rogers | ................. | G06Q 10/087 |
| 10,579,873 B2* | 3/2020 | Lipsey | ................... | G06N 20/00 |
| 11,049,177 B2* | 6/2021 | White | .................... | B25H 3/028 |
| 11,132,641 B2* | 9/2021 | Ellis | .................... | G06K 17/0022 |

(Continued)

Primary Examiner — Daniel J Troy
Assistant Examiner — Timothy M Ayres
(74) Attorney, Agent, or Firm — Wang Law Firm, Inc.

(57) ABSTRACT

An intelligent storage system and an intelligent storage method thereof are disclosed. The system includes a cabinet and loading tables, each loading table includes an accommodating groove having a shape corresponding the shape of the object to be stored, and a sensing device in the accommodating groove. A central control device includes a processor electrically connected to the sensing device, the output device and an input device, and a system database for the processor to access or store information. The sensing devices senses whether there is a corresponding stored object in each accommodating groove to form a status signal carrying an identification code, and outputs it to the processor, then the processor accesses the corresponding information in the system database according to the identification code of the status signal, so as to realize the management and status display of the stored object, and effectively improve work safety and effectiveness.

7 Claims, 6 Drawing Sheets

(56) References Cited

U.S. PATENT DOCUMENTS

| | | | |
|---|---|---|---|
| 11,655,102 B2* | 5/2023 | Fly | B65G 1/1371 |
| | | | 700/214 |
| 2007/0023193 A1* | 2/2007 | King | B25H 3/028 |
| | | | 166/387 |
| 2008/0017709 A1* | 1/2008 | Kennedy | G06Q 10/087 |
| | | | 705/28 |
| 2008/0059338 A1* | 3/2008 | Hubbard | G06Q 10/087 |
| | | | 705/28 |
| 2008/0088454 A1* | 4/2008 | Flores | G07G 1/009 |
| | | | 340/572.4 |
| 2008/0120200 A1* | 5/2008 | Hurtis | G06Q 10/087 |
| | | | 705/28 |
| 2009/0071854 A1* | 3/2009 | Martin | B25H 3/02 |
| | | | 264/494 |
| 2009/0072029 A1* | 3/2009 | Martin | B25H 3/028 |
| | | | 235/385 |
| 2018/0232577 A1* | 8/2018 | Lipsey | B25H 3/028 |
| 2020/0410434 A1* | 12/2020 | Fly | B25H 3/028 |
| 2021/0125141 A1* | 4/2021 | Lipsey | G06F 16/9554 |
| 2022/0253793 A1* | 8/2022 | Hill | G06Q 10/087 |

* cited by examiner

INTELLIGENT STORAGE SYSTEM AND AN INTELLIGENT STORAGE METHOD THEREOF

BACKGROUND

Field of the Invention

The present invention relates to a storage system, and more particularly to a cabinet with intelligent storage functions.

Related Prior Art

A storage cabinet generally refers to a cabinet for storing objects, and can be used in many different fields. It is worth noting that working spaces such as factories and construction sites usually need to store a large number of tools with different functions. These tools have different contours according to their functions, which makes it difficult to organize and store a large number of tools. Therefore, when the tools are not in use, they are often stored in piles in bags, which not only makes it difficult to identify and find the required tools when picking out tools, but also the piles of tools are easy to collide, causing damage. Besides, it is more difficult to effectively manage a large number of tools. The consequences may range from the loss of tools that affect the work progress, and the worst may cause industrial safety accidents due to random placement of tools; however, in large-scale factories or construction sites, there are many people using tools. Management of tools is not easy. Therefore, how to achieve effective tool management is an important issue to improve work safety and work efficiency.

SUMMARY

One objective of the present invention is to provide an intelligent storage system and an intelligent storage method thereof. The system includes a cabinet and a plurality of loading tables, a sensing device, a central control device and an output device, wherein each of the loading tables is provided with at least one accommodating groove having a shape corresponding the shape of the object to be stored, and is provided with a sensing device. The central control device includes a processor in electrical connection with the sensing device, the output device and an input device, and a system database for the processor to access or store information; thereby, the system of the present invention senses whether there is a corresponding stored object in each accommodating groove through the sensing device to form a status signal carrying an identification code, and outputs the status signal carrying the identification code to the processor, and the processor accesses the corresponding information in the system database according to the identification code of the status signal, so as to realize the management and status display of the stored object, and effectively improve work safety and work effectiveness.

To achieve the above objective, an intelligent storage system used to store and manage objects, and comprises:

a cabinet including a plurality of storage spaces; a plurality of loading tables in the form of drawers and disposed in the storage spaces, wherein the number of the loading tables corresponds to the number of the storage spaces, and each of the loading tables is provided with at least one accommodating groove having a shape corresponding to a shape of an object to be stored; at least one sensing device disposed in the accommodating groove to sense whether the stored object is correctly placed in the accommodating groove and output a status signal, and the status signal carries an identification code of the stored object; a central control device including a processor and a system database for the processor to access or store information, wherein the system database includes a status database and/or an identification database, the processor is electrically connected to the sensing device, the status signal is received by the processor to form a dynamic message carrying an identification code, the dynamic message is stored in the status database, and the identification database stores an item message carrying the identification code; and an output device electrically connected to the processor of the central control device; by such arrangements, after the processor accesses and receives the status signal, the output device displays the selective accessing of the dynamic message and/or the item message carried in the status database and/or an identification database, according to the identification code carried by the status signal.

To achieve the above objective, the invention provides an intelligent storage method for an intelligent storage system, and the present invention comprises the following steps:

a step of unlocking: accessing, by the input device, a personnel code carried by a user identification object to obtain a personnel identification signal carrying a personnel identification code, and outputting the personnel identification signal to the processor; determining, by the processor, whether there is a user message carrying the corresponding personnel identification code in the user database for matching according to the personnel identification code carried by the personnel identification signal; then, outputting, by the processor, a matching result to the output device, and/or unlocking or locking the cabinet according to the matching result;

a step of taking out and putting in: after unlocking the cabinet, creating, by the sensing device, a corresponding status signal that carries the identification code of the stored object according to whether the stored object is taken out or put in the accommodating groove, and outputting the corresponding status signal to the processor; and a step of displaying status: after the processor accesses and receives the corresponding status signal, selectively accessing, by the processor, a dynamic message and/or an item message carried in the status database and/or an identification database, according to the identification code carried by the status signal, and then outputting to the output device.

In addition, the intelligent storage method for an intelligent storage system in accordance with the present invention further comprises: a step of updating status: after the processor matches the personnel identification signal and the user message with the same personnel identification code, integrating, by the processor, the matched user message and the status signal accessed after unlocking the cabinet to form a usage data information carrying the identification code and the personnel identification code, and outputting the usage data information to the status database for storage to update the latest status of the stored object.

With regard to the techniques, means and other effects adopted by the present invention to achieve the above-mentioned objective, preferred and feasible embodiments are described in detail in conjunction with the drawings as follows.

DETAILED DESCRIPTION

In order to facilitate the understanding of the present invention, the invention is described in connection with the embodiments as follows.

Figure 1:
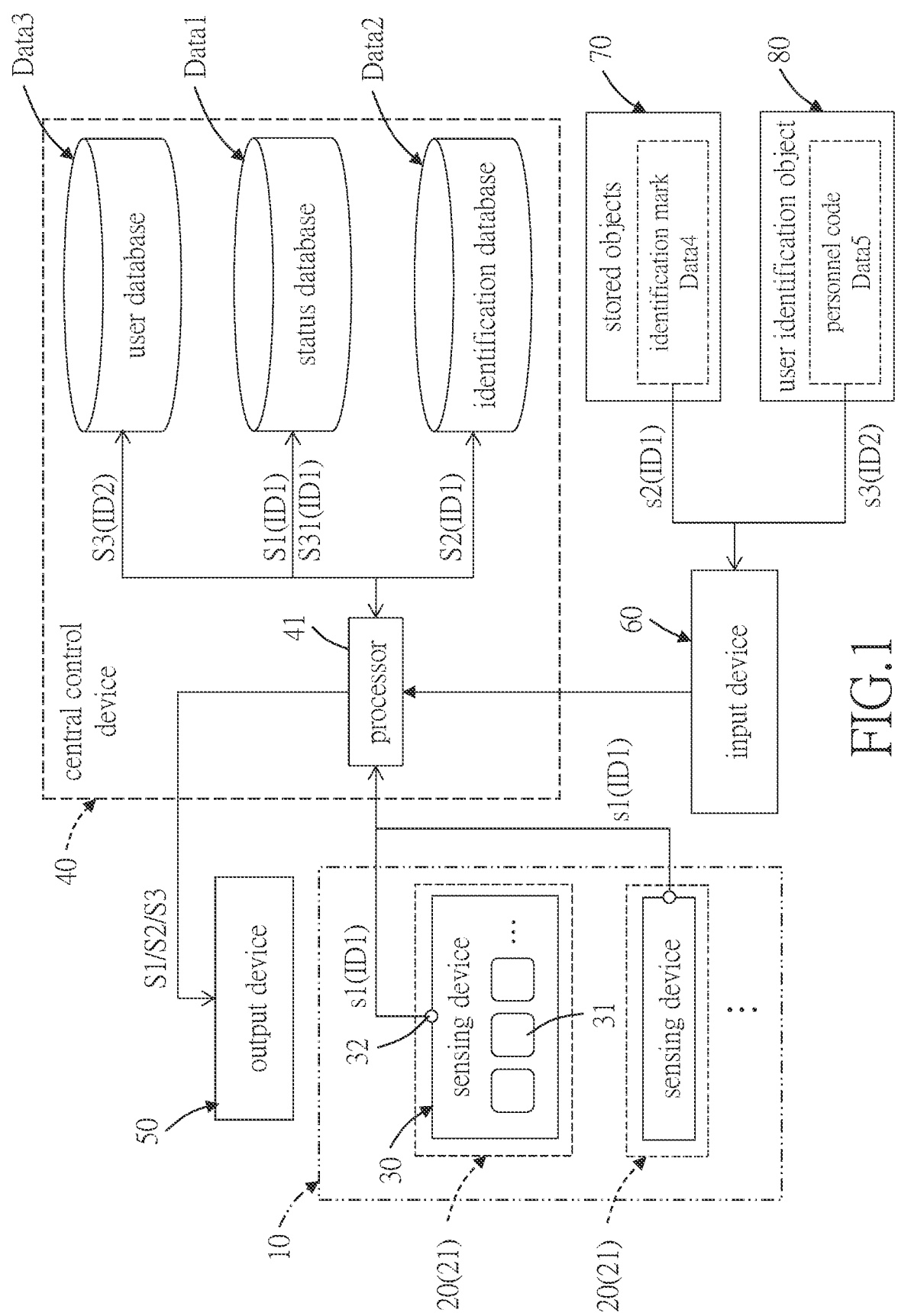
FIG. 1 is a schematic diagram of the overall architecture of the intelligent storage system of the present invention.

As shown in FIG. 1, a schematic diagram of the overall appearance of the first embodiment of the intelligent storage system of the present invention is shown. As shown in FIG. 1, the intelligent storage system 100 of the present invention is used to store objects 70. The intelligent storage system 100 includes a cabinet 10 and a plurality of pull-out loading tables 20, a plurality of sensing devices 30, a central control device 40, an output device 50 and an input device 60. Each of the loading tables 20 is provided with a plurality of accommodating grooves 21 each having a shape corresponding to the shape of the object to be stored, each of the sensing devices 30 is disposed in a corresponding one of the accommodating grooves 21. The central control device 40 includes a processor 41 electrically connected to the sensing devices 30, the output device 50 and the input device 60, and a system database for the processor 41 to access or store information.

Specifically, please refer to FIG. 1 in conjunction with FIGS. 2 to 6, the cabinet 10 is provided with a plurality of storage spaces 11. The number of the loading tables 20 corresponds to the number of the storage space 11, and the loading tables 20 can be the drawers installed in the storage spaces 11. Each of the loading tables 20 is provided with at least one accommodating groove 21, and the shape of each of the accommodating grooves 21 corresponds to the shape of each of the stored objects. Each of the accommodating grooves 21 holds a corresponding one of the sensing devices 30 for sensing whether the stored object is correctly placed in the accommodating groove 21 and outputting a corresponding status signal s1, which carries an identification code ID1 of the stored object 70. The central control device 40 includes a processor 41 and a system database for the processor 41 to access or store information, and the system database includes a status database Data1 and/or an identification database Data2. The processor 41 is electrically connected to the sensing device 30. The status signal s1 is received by the processor 41 to form a dynamic message S1 carrying an identification code ID1, and the dynamic message S1 is stored in the status database Data1. The identification database Data2 stores an item message S2 carrying the identification code ID1. The output device 50 and the input device 60 are electrically connected to the processor 41 of the central control device 40.

In the embodiment of the present invention, the shape of each of the accommodating grooves 21 corresponds to the shape of each of the stored objects, which means that the shape of the opening and or the groove wall that define the accommodating groove 21 is same or similar to the shape of the stored object, so that the sensing device 30 can reliably sense whether the object is stored correctly. Accordingly, as shown in FIG. 1, the intelligent storage system 100 of the present invention can access and receive the status signal s1 through the processor 41, and then the output device 50 displays that the processor 41 selectively accesses the dynamic message S1 and/or the item message S2 carried in the status database Data1 and/or an identification database Data2, according to the identification code ID1 carried by the status signal s1.

In the embodiment of the present invention, as shown in FIG. 1, the input device 60 of the intelligent storage system 100 of the present invention is used to access the identification mark Data4 of the stored object 70; thereby, the intelligent storage system 100 of the present invention can access the identification mark Data4 through the input device 60 to form an identification mark signal s2 carrying the identification code ID1, and then output it to the processor 41. The processor 41 determines whether there is a dynamic message S1 and/or item message S2 carrying the corresponding identification code ID1 in the status database Data1 and/or the identification database Data2 according to the identification code ID1 carried by the identification mark signal s2 for matching, and then output the matching result and the corresponding message content to the output device 50.

In the embodiment of the present invention, as shown in FIG. 1, the input device 60 of the intelligent storage system 100 of the present invention can also be used to access a personnel code Data5 of an user identification object 80. The system database of the central control device 40 includes an user database Data3, which stores an user message S3 carrying a personnel identification code ID2; thereby, the input device 60 accesses the personnel code Data5 to form a personnel identification signal s3 carrying the personnel identification code ID2, and output the personnel identification signal s3 to the processor 41. The processor 41 determines whether there is a user message S3 carrying the corresponding personnel identification code ID2 in the user database Data3 for matching according to the personnel identification code ID2 carried by the personnel identification signal s3. The processor 41 then outputs the matching result to the output device 50 and/or unlocks or locks the cabinet 10 according to the matching result. After the processor 41 matches the personnel identification signal s3 and the user message S3 with the same personnel identification code ID2, the processor 41 integrates the matched user message S3 and the status signal s1 accessed after unlocking the cabinet 10 to form a usage data information S31 carrying the identification code ID1 and the personnel identification code ID2, and outputs it to the status database Data1 for storage.

In an embodiment of the present invention, as shown in FIG. 1, the status database Data1 may further include a dynamic information storage unit and a usage data information storage unit, which are respectively electrically connected to the processor 41 for storage or access the dynamic message S1 and/or the usage data message S31.

In the embodiment of the present invention, as shown in FIG. 1, each of the sensing devices 30 includes a sensing element 31 and a signal transmission element 32; the sensing element 31 is selected from a group consisting of a photosensitive element, a piezoelectric sensing element, a resistance sensing element and a combination thereof. The signal transmission element 32 is selected from a group consisting of a wireless transceiver component, a sensor, a wired transmission component, and a combination thereof.

In an embodiment of the present invention, as shown in FIGS. 2 to 6, the central control device 40 includes a prompt element 42 electrically connected to the processor 41, and the processor 41 drives the prompt element 42 to work according to the status signal s1. Specifically, the prompt element 42 is selected from a group consisting of a light-emitting element, an audio element, and a combination thereof. The prompt element 42 can be set on the exposed surface of the equipment in the system of the present invention, and indicate the state of the stored objects through light or sound. Preferably, the prompt element 42 can be arranged on the front side of the output device 50, the surface of the cabinet 10 and/or the exposed surface of the loading table 20 when it is folded, so as to facilitate the user to receive the prompt message.

Figure 2:
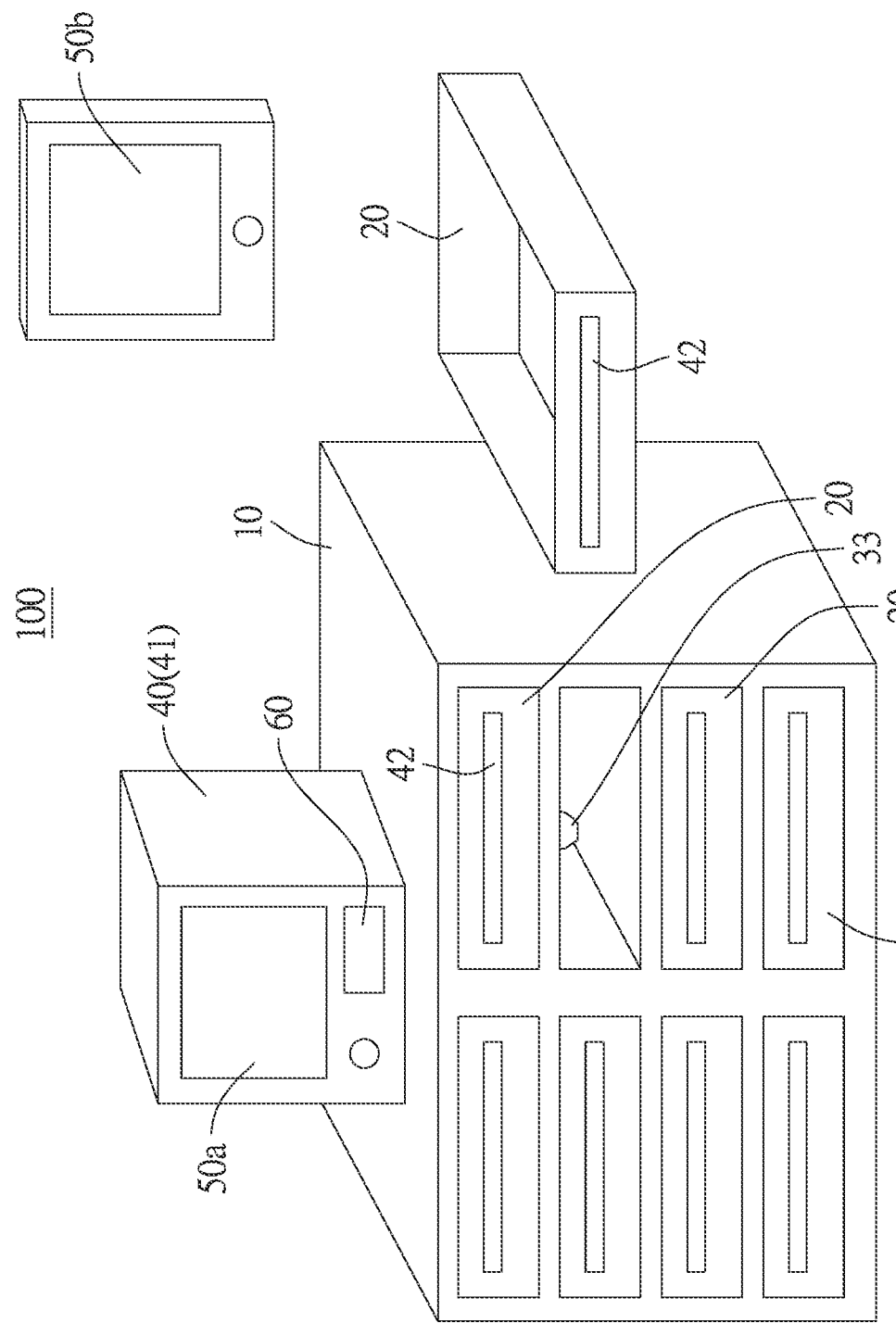
FIG. 2 is a schematic diagram of the appearance of a first embodiment of the intelligent storage system of the present invention.

In the embodiment of the present invention, the output device 50 is selected from a group consisting of a desktop screen 50a, a handheld device 50b, and a combination thereof as shown in FIG. 2, so as to facilitate the user to use in different working spaces and improve work efficiency.

In the embodiment of the present invention, each of the objects to be stored is a tool, especially a small tool, a hand tool, etc., but not limited to this, so that it can be stored in the loading table 20, and any tool that can be stored in the loading table 20 and sense whether it is placed in the corresponding accommodating groove 21 through light sensing, piezoelectric, etc. can be the stored object of the present invention.

The above describes the overall architecture of the intelligent storage system of the present invention. Please refer to FIG. 1 which illustrates the intelligent storage method of the intelligent storage system of the present invention. The intelligent storage method for the intelligent storage system of the present invention comprises the following steps:

a step of unlocking: accessing, by the input device 60, the personnel code Data5 carried by the user identification object 80 to obtain the personnel identification signal s3 carrying the personnel identification code ID2, and outputting it to the processor 41, determining, by the processor 41, whether there is a user message S3 carrying the corresponding personnel identification code ID2 in the user database Data3 for matching according to the personnel identification code ID2 carried by the personnel identification signal s3, then, outputting, by the processor 41, the matching result to the output device 50, and/or unlocking or locking the cabinet 10 according to the matching result;

a step of taking out and putting in: after unlocking the cabinet 10, creating, by the sensing device 30, a corresponding status signal s1 that carries the identification code ID1 of the stored object according to whether the stored object is taken out or put in the accommodating groove 21, and outputting the corresponding status signal s1 to the processor 41;

a step of displaying status: after the processor 41 accesses and receives the status signal s1, selectively accessing, by the processor, the dynamic message S1 and/or the item message S2 carried in the status database Data1 and/or an identification database Data2, according to the identification code ID1 carried by the status signal s1, and then outputting to the output device 50; and a step of updating status: after the processor 41 matches the personnel identification signal s3 and the user message S3 with the same personnel identification code ID2, integrating, by the processor 41, the matched user message S3 and the status signal s1 accessed after unlocking the cabinet 10 to form a usage data information S31 carrying the identification code ID1 and the personnel identification code ID2, and outputting the usage data information S31 to the status database Data1 for storage to update the latest status of the stored objects.

Please refer to FIGS. 2-6 which illustrates specific embodiments of the intelligent storage system 100, 100a, 100b and the loading table 20, 20a, 20b of the present invention.

FIG. 2 shows the first embodiment of the system of the present invention: an intelligent storage system 100, which includes a central control device 40 and a plurality of pull-out loading tables 20. The central control device 40 includes a processor 41 and a system database (not shown) for the processor 41 to access or store information. In an embodiment of the intelligent storage system 100 of the present invention, the cabinet 10 is provided with a plurality of storage spaces 11; the loading tables 20 are in the form of drawers and installed in the storage spaces 11, and the number of the loading tables corresponds to the number of the storage spaces 11.

Figure 3:
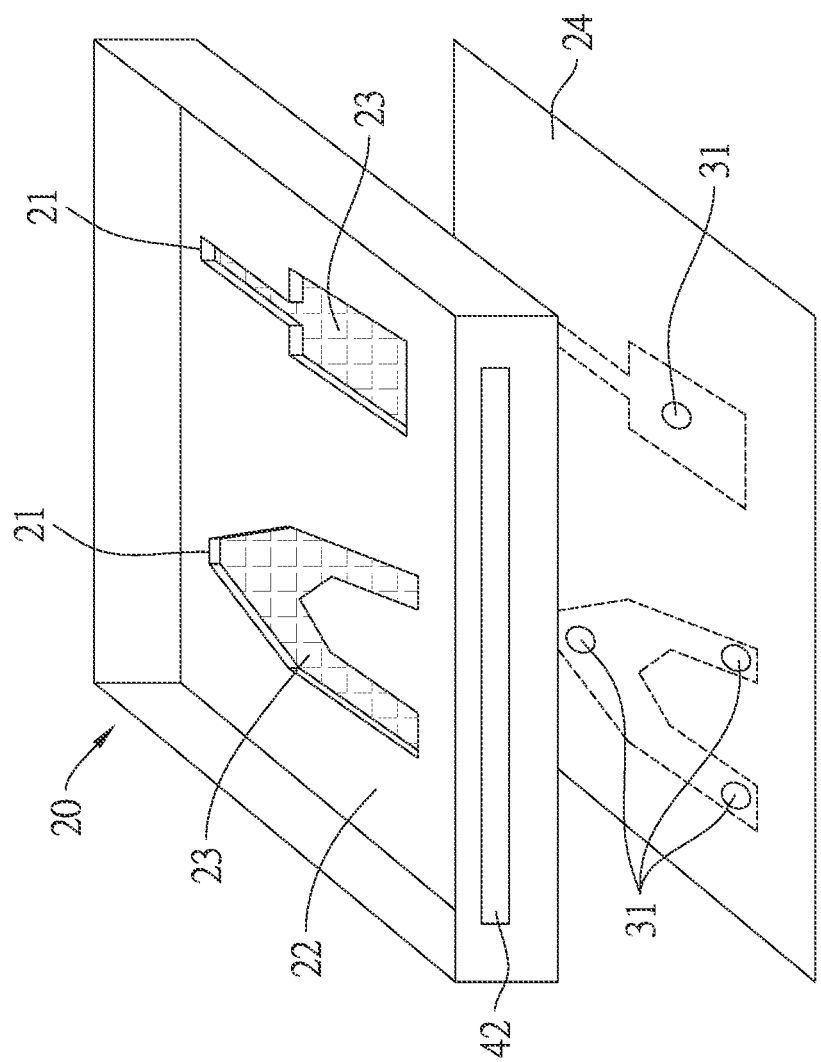
FIG. 3 is a schematic diagram of the first embodiment of the loading table of the intelligent storage system of the present invention.

FIG. 3 is a schematic diagram of the appearance of the first embodiment of the loading table 20 of the present invention, for the convenience of explanation, just one loading table is described as an example. The bottom plate 24 shown in FIG. 3 is disassembled from the bottom of the loading table 20 for ease of description. As shown in FIG. 3, the loading table 20 may be a drawer, and a space for accommodating the stored object is formed on a bearing board 22 of the loading table 20, and the stored object may be, for example, a screwdriver. Under the bearing board 22, the sensing element 31 of each of the sensing devices 30 can be arranged at a position corresponding to the stored object to sense the stored object. As shown in FIG. 1, the sensing element 31 can send the status signal s1 to the central control device 40 through the signal transmission component 32 to confirm whether the stored object is placed in the loading table 20 and record the confirmed result in the status database Data1.

As shown in FIG. 2, a light-emitting element 33 is optionally provided above the loading table 20, and the light-emitting element 33 may be, for example, an LED bulb. As shown in FIG. 3, the bearing board 22 at the bottom of the loading table 20 is provided with at least one accommodating groove 21 with a shape corresponding to the shape of the object to be stored. The accommodating slot 21 is located where the stored object is expected to be placed after the user returns the stored object. A light-transmitting panel 23 is provided at the bottom of the accommodating groove 21, and the light-transmitting panel 23 may be, for example, transparent glass or transparent plastic. A bottom plate 24 is further provided under the light-transmitting panel 23, and the sensing elements 31 are disposed on the bottom plate 24 at a position corresponding the accommodating groove 21, so that the sensing elements 31 are disposed between the bottom plate 24 and the light-transmitting panel 23 and located corresponding to the accommodating groove 21. Or, the sensing elements 31 can also be directly arranged on the bottom surface of the light-transmitting panel 23. When the light-emitting elements 33 in the storage spaces 11 of the cabinet 10 and above the loading table 20 emit light, the light will pass through the light-transmitting panel 23, so that the sensing elements 31 can sense the light. When all the sensing elements 31 sense the light, which means that there is no object blocking the light, and it can be determined that the stored object is not placed in the accommodating groove 21; on the contrary, when all the sensing elements 31 do not sense the light, it means that the object has been correctly placed in the accommodating groove 21 that matches its shape. Furthermore, when some of the sensing elements 31 sense light and some do not sense the light, it means that the stored object is not correctly placed in the accommodating groove 21, the object is not placed properly, or it may be placed in the wrong tool storage location. Thereby, the sensing elements 31 can create a status signal s1 carrying the identification code ID1 according to the storage state of the stored object and send it to the central control device 40 shown in FIG. 1 to display whether the object is placed in the loading table 20.

More specifically, in the embodiment of the present invention, for the same accommodating groove 21, the number of sensing elements 31 can be selectively increased to confirm that the object the user places is the object that should be placed here by default, and is correctly placed in the accommodating groove 21. As shown in FIG. 3, the shape of the accommodating groove 21 is equivalent to the shape of the object to be stored (for example, a vise). Three sensing elements 31 can be arranged below the light-transmitting panel 23 of the accommodating groove 21, respectively located at three corners of the accommodating groove 21. When the light emitted by the light-emitting element 33 passes through the light-transmitting panel 23, if two of the three sensing elements 31 cannot sense the light, but one of the three sensing elements 31 senses the light, it means that the object placed in the accommodating groove 21 is wrong or not placed properly. Conversely, if none of the three sensing elements 31 can sense the light, it means that the stored object placed in the accommodating groove 21 is the correct object to be stored, for example, a vise, which is also placed correctly and neat.

Figure 4:
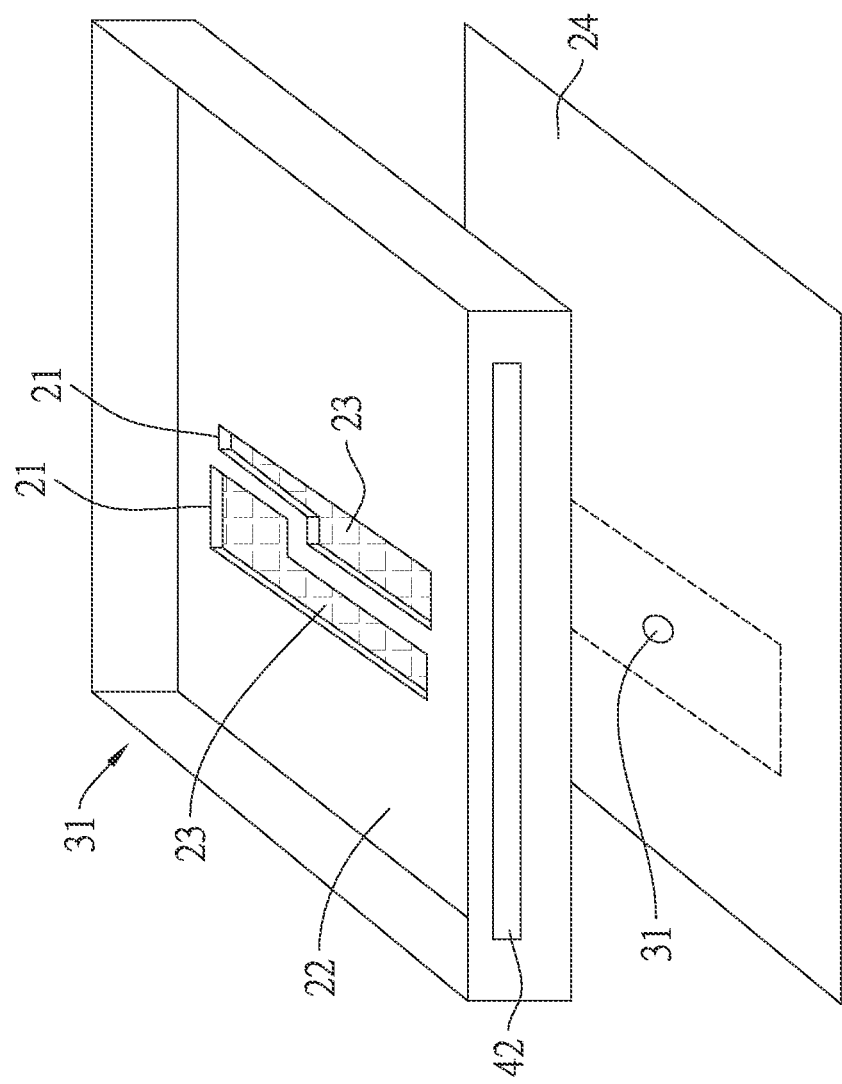
FIG. 4 is a schematic diagram of a second embodiment of the loading table of the intelligent storage system of the present invention.

More specifically, in the embodiment of the present invention, for a plurality of accommodating grooves 21, one sensing element 31 can be selectively shared, so as to reduce the cost of setting the sensing element 31. As shown in FIG. 4, the shape of the accommodating groove 21 is the same as the shape of the object to be stored (for example, a steel brush), and the shape of the other accommodating groove 21 may be the same as the shape of another object (for example, a vernier ruler). Only one sensing element 31 is provided under the transparent panels 23 of the two accommodating grooves 21. When the light emitted by the light-emitting element 33 passes through the light-transmitting panels 23, if the sensing element 31 senses the light, it means that at least one of the two accommodating grooves 21 is not in position or placed incorrectly. Conversely, if the sensing element 31 cannot sense the light, it means that the two storage objects corresponding to the two accommodating grooves 21 exist at the same time and are placed neatly.

As shown in FIG. 2, the central control device 40 is integrated with the output device 50 and the input device 60 to form a multifunctional device. In the embodiment of the present invention, the input device 60 is a scanning device that can be used to access the personnel code Data5 of the user identification object 80 to send the personnel identification signal s3 to the processor 41, so that the processor 41 can access the user information S3 stored in the user database Data3 for matching, so as to identify the user identity of the user identification object 80. In the embodiment of the present invention, the desktop screen 50a may be a touch screen to present a user interface and display the storage location of the stored object, whether it exists, or has been borrowed, for the user to select the object he/she wants to use. Optionally, the user interface may be an application program loaded on the handheld device 50b. Both the application program and the central control device 40 are connected to the server, so that the user can search for the tools in the intelligent storage system of the present invention on his tablet or mobile phone.

The steps that the central control device 40 can perform include: after confirming the identity of the user, unlocking or popping up the loading table 20 where the stored object selected by the user is located. And, after the stored object is taken out, logging in and updating the user's use record of taking out the stored object, and storing the record in the status database Data1 of the central control device 40.

Further, the steps that the central control device 40 can perform include: determining whether the stored objected has been returned; confirming the user's identity; and logging the tool return record. Wherein, the way to determine whether the stored object has been returned is: if the sensing element 31 cannot sense light, it means that the stored object corresponding to the sensing element 31 has been re-placed in the accommodating groove 21, then determining the stored object has been returned. After determining that the stored object has been returned, in the status database Data1, use the identification code ID1 of the stored object as an index to find the borrowing record of the stored object to confirm the identity of the borrower of the stored object. In this way, when the returnee of the stored object is different from the borrower, after the returnee logs into the system, he/she can still return the stored object for the borrower. Finally, logging and updating a return record of the stored object that has been returned, and storing the return record in the status database Data1.

As shown in FIG. 2, the intelligent storage system 100 of the present invention may include a plurality of loading tables 20, each of which can be used to hold one or more objects to be stored. An exposed part of the front side of each of the plurality of loading tables 20 can be provided with a prompt element 42 such as a light signal, so that after the user selects the stored object to be used, the processor 41 electrically controls the light to indicate the location of the stored object. Alternatively, after receiving the status signal s1, the processor 41 controls the lighting mode (long lighting, changing the flicker frequency, etc.) to indicate the state of the stored object.

Figure 5:
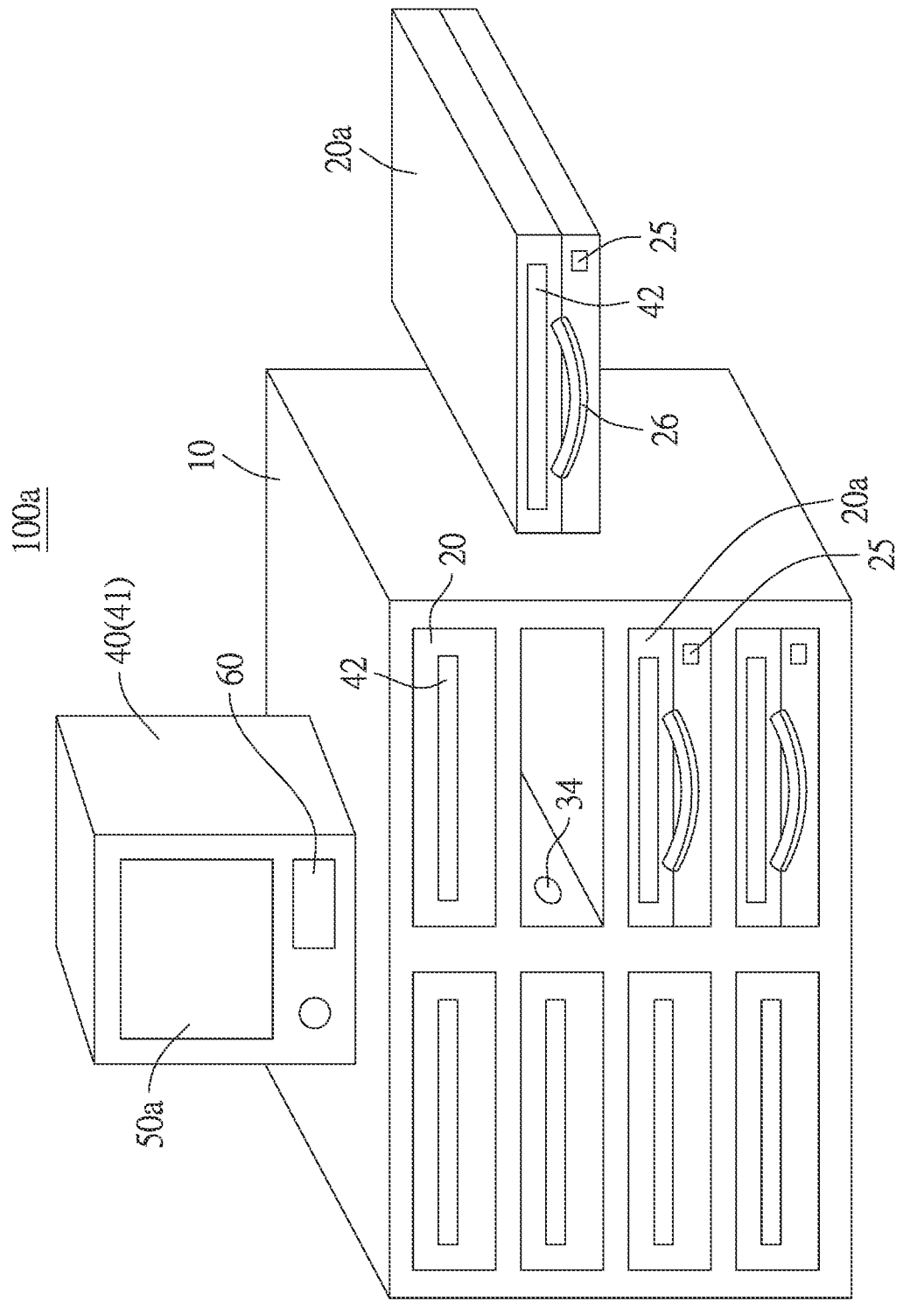
FIG. 5 is a schematic diagram of the appearance of the second embodiment of the intelligent storage system of the present invention.

FIG. 5 is a schematic diagram of the appearance of the intelligent storage system 100a of the second embodiment of the present invention. In this embodiment, each of the loading tables 20a is in the form of a toolbox with a handle 26. As shown in FIG. 4, the intelligent storage system 100a of the present invention further includes a loading-table sensing element 34 arranged on an inner surface of the storage space 11 of the cabinet 10 to sense the loading table 20a, wherein the loading-table sensing element 34 is communicatively connected with the central control device 40 to output a status signal of the loading table 20a to the central control device 40 for the processor 41 to determine whether the loading table 20a is in position. Similarly, a prompt element 42 can be provided on an outer surface of the loading table 20a, and if the stored object selected by the user is inside the loading table 20a, the light will be on for indication. Optionally, a radio frequency identification (RFID) tag 25 may be provided on the loading table 20a to facilitate the search for the loading table 20a.

Figure 6:
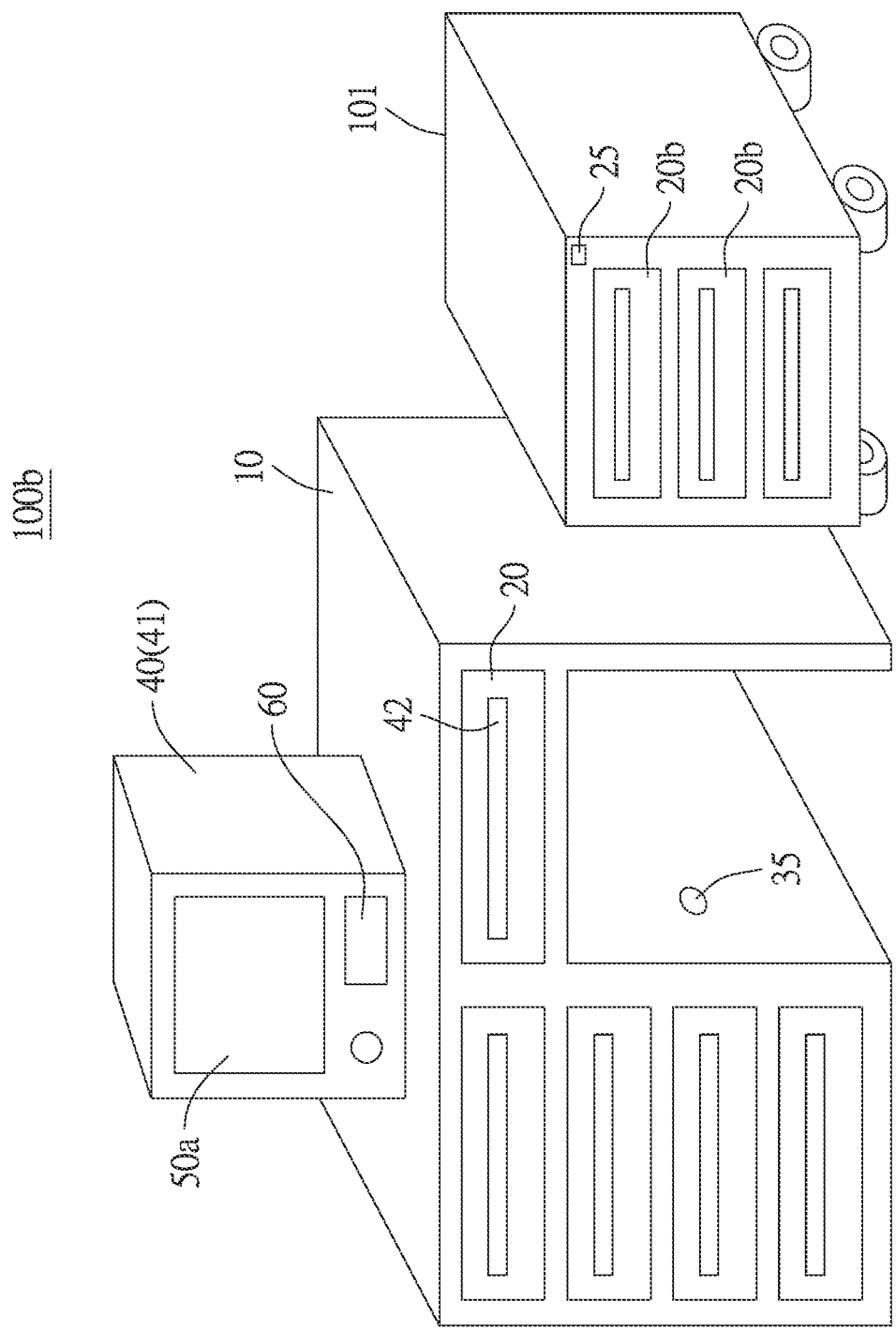
FIG. 6 is a schematic diagram of the appearance of a third embodiment of the intelligent storage system of the present invention.

FIG. 6 is a schematic diagram of the appearance of the intelligent storage system 100b of the present invention. Wherein, the intelligent storage system 100b also includes a sub-storage system 101, which includes a plurality of loading tables 20b, the loading tables 20b shown in FIG. 5 have the same structure as the loading tables 20 shown in FIG. 3. In the intelligent storage system 100b of the present invention, the cabinet 10 may also be provided with a sub-storage system sensing element 35 for sensing the sub-storage system 101. The sub-storage system sensing element 35 is communicatively connected with the central control device 40 to output the status signal of the sub-storage system 101 to the central control device 40 for the processor 41 to determine whether the sub-storage system 101 is in position. Optionally, the sub-storage system 101 can also be provided with a radio frequency identification tag 25 to facilitate searching for the sub-storage system 101.

While we have shown and described various embodiments in accordance with the present invention, it is clear to those skilled in the art that further embodiments may be made without departing from the scope of the present invention.

What is claimed is:

1. An intelligent storage system used to store and manage objects, and comprising:
a cabinet including a plurality of storage spaces and at least one sensing device;
a plurality of loading devices disposed in the storage spaces, wherein the number of the loading devices corresponds to the number of the storage spaces, and each of the loading devices is provided with at least one accommodating groove having a shape corresponding to a shape of an object to be stored;
a plurality of radio frequency identification (RFID) tags attached to the stored object to interact with the sensing device to sense whether the stored object is correctly placed in the accommodating groove and output a status signal, and the status signal carries an identification code of the stored object;
a central control device including a processor and a system database for the processor to access or store information, wherein the system database includes a status database and/or an identification database, the processor is electrically connected to the sensing device, the status signal is received by the processor to form a dynamic message carrying an identification code, the dynamic message is stored in the status database, and the identification database stores an item message carrying the identification code; and
an output device electrically connected to the processor of the central control device;
by such arrangements, after the processor accesses and receives the status signal, the output device displays the selective accessing of the dynamic message and/or the item message carried in the status database and/or an identification database, according to the identification code carried by the status signal;
wherein the sensing devices includes a sensing element and a signal transmission element; the sensing element is selected from a group consisting of a photosensitive element, a piezoelectric sensing element, a resistance sensing element and a combination thereof, and the signal transmission element is selected from a group consisting of a wireless transceiver component, a sensor, a wired transmission component, and a combination thereof;
wherein a light-transmitting panel is provided at a bottom of the accommodating groove, and the sensing element is disposed under the light-transmitting panel; a light-emitting element is disposed in the storage space of the cabinet above the loading device to emit light to the sensing element through the light-transmitting panel, whereby the sensing element senses the light from the emitting element when the stored object is placed in the accommodating groove, and the sensing element senses the light from the emitting element when the stored object is not or incorrectly placed in the accommodating groove.

2. The intelligent storage system as claimed in claim 1 further comprising an input device electrically connected to the processor of the central control device, wherein the input device is used to access an identification mark of the stored object; thereby, the input device accesses the identification mark to form an identification mark signal carrying the identification code, and outputs the identification mark signal to the processor, then the processor determines whether there is a dynamic message and/or item message carrying the corresponding identification code in the status database and/or the identification database according to the identification code carried by the identification mark signal for matching, and then outputs a matching result and a corresponding message content to the output device.

3. The intelligent storage system as claimed in claim 1 further comprising an input device electrically connected to the processor of the central control device, wherein the input device is used to access a personnel code of an user identification object, the system database of the central control device includes an user database, which stores an user message carrying a personnel identification code; thereby, the input device accesses the personnel code to form a personnel identification signal carrying the personnel identification code, and output the personnel identification signal to the processor, then the processor determines whether there is a user message carrying the corresponding personnel identification code in the user database for matching according to the personnel identification code carried by the personnel identification signal, and the processor then outputs a matching result to the output device and/or unlocks or locks the cabinet according to the matching result.

4. The intelligent storage system as claimed in claim 3, wherein after the processor matches the personnel identification signal and the user message with the same personnel identification code, the processor integrates the matched user message and the status signal accessed after unlocking the cabinet to form a usage data information carrying the identification code and the personnel identification code, and outputs the usage data information to the status database for storage.

5. The intelligent storage system as claimed in claim 1, wherein the central control device includes a prompt element electrically connected to the processor, and the processor drives the prompt element to work according to the status signal.

6. The intelligent storage system as claimed in claim 5, wherein the input device is selected from a group consisting of a screen, a handheld device and a combination thereof.

7. The intelligent storage system as claimed in claim 1, wherein the stored object is a tool.

* * * * *